(12) United States Patent
Waguet (10) Patent No.: US 7,954,111 B2
(45) Date of Patent: May 31, 2011

(54) DATA STRUCTURES FOR CONTEXT INFORMATION RELATED TO BUSINESS EVENTS

(75) Inventor: Cyrille Waguet, St-Leon-Rot (DE)

(73) Assignee: SAP AG, Walldorf (DE)

( * ) Notice: Subject to any disclaimer, the term of this patent is extended or adjusted under 35 U.S.C. 154(b) by 1185 days.

(21) Appl. No.: 11/648,430

(22) Filed: Dec. 28, 2006

(65) Prior Publication Data

US 2008/0162565 A1    Jul. 3, 2008

(51) Int. Cl.
*G06F 13/00* (2006.01)
(52) U.S. Cl. .......................... 719/318; 719/330
(58) Field of Classification Search .................. 719/318, 719/330
See application file for complete search history.

(56) References Cited

U.S. PATENT DOCUMENTS

| | | | | |
|---|---|---|---|---|
| 7,496,927 | B2 * | 2/2009 | Hammer et al. | 719/318 |
| 7,765,557 | B2 * | 7/2010 | Young | 719/318 |
| 2003/0187743 | A1 * | 10/2003 | Kumaran et al. | 705/26 |
| 2006/0069666 | A1 * | 3/2006 | Burke et al. | 707/2 |
| 2006/0106626 | A1 * | 5/2006 | Jeng et al. | 705/1 |
| 2006/0111921 | A1 * | 5/2006 | Chang et al. | 705/1 |
| 2008/0120129 | A1 * | 5/2008 | Seubert et al. | 705/1 |

* cited by examiner

*Primary Examiner* — Andy Ho
(74) *Attorney, Agent, or Firm* — Mintz, Levin, Cohn, Ferris, Glovsky and Popeo, P.C.

(57) ABSTRACT

Methods and apparatus, including computer program products, related to data structures for context information related to business events. Data characterizing an event of one or more business processes (e.g., an event corresponding to a business activity in one or more computer-implemented business processes) is received, and a data structure is generated to enable event resolution. The data structure is generated in response to receiving the data and the data structure includes information about the event derived from the data and information to assist retrieving further information related to the event. The data structure may be defined in accordance with a declarative programming language. A business process to include events that are resolved with the use of a data structure including context information and a data structure (e.g., a designtime data structure) may be modeled in a visual modeling tool.

17 Claims, 4 Drawing Sheets

DATA STRUCTURES FOR CONTEXT INFORMATION RELATED TO BUSINESS EVENTS

BACKGROUND

The present disclosure relates to data processing by digital computer, and more particularly to data structures for context information related to business events.

In general, a computing system for an enterprise may receive numerous events from different sources. The events may be user-generated or machine-generated (e.g., a computing system may generate a message in response to a change in status of the computing system). The computing system may have defined procedures for determining how to respond to the events. Responding to many events, from the different sources, in an efficient manner may be challenging and may result in poor performance. For example, a queue of events may be resolved slowly as resolution of each event may require a lot of communication to gather information necessary to resolve the event.

SUMMARY

The present disclosure provides methods and apparatus, including computer program products, that implement techniques for data structures for context information related to business events.

In one aspect, data characterizing an event of one or more business processes (e.g., an event corresponding to a business activity in one or more computer-implemented business processes) is received, and a data structure is generated to enable event resolution. The data structure is generated in response to receiving the data and the data structure includes information about the event derived from the data and information to assist retrieving further information related to the event.

In another aspect, a data structure to enable event resolution comprises information about the event derived from the data and information to assist retrieving further information related to the event.

The subject matter may be implemented as, for example, computer program products (e.g., as source code or compiled code), computer-implemented methods, and systems.

Variations may include one or more of the following features.

A data structure may be defined in accordance with a declarative programming language. A module may be able to generate a data structure from data characterizing the event by generating code in accordance with the declarative programming language.

The event may be generated in response to user interaction with a user interface from which a user is enabled to gain services of a business process. Or, the event may be generated in response to computer interaction (e.g., generated in response to receipt of a message form a computing system).

The event may relate to an orchestration of a web service in accordance with a business process. A business process may be described in a messaging protocol for business processes and implemented in accordance with the messaging protocol. A business process may also be one or more rules that are business-oriented (e.g., forward all reimbursement requests to accounting).

A business process and a data structure (e.g., a designtime data structure) may be modeled in a visual modeling tool. A runtime implementation of the business process may be one of the business processes.

A relationship defined in accordance with an ontology may be received. The data structure may be modified to include the relationship. Also, a relationship may be included in a data structure by another technique, for example, by being included in a designtime version of the data structure.

An alert may be generated if rules of any business processes specify the alert is to be generated in response to an event that is received. An alert need not be generated as a result of rules. For example, an alert may be generated as a result of the processing of some information available in the data structure and not only through rules within the "backbone" business processes.

The data structure may further include an event resolution procedure. A determination may be made as to whether the event resolution procedure prescribes event resolution for the event and, if so, the event resolution procedure may be initiated.

A designtime data structure may be selected from multiple designtime data structures. The designtime data structure may be used to generate the data structure. The selection of the designtime data structure may depend on the data characterizing the event (e.g., an accounting type data structure may be selected for an event involving receiving an invoice).

Multiple data structures may be generated in response to receiving the event.

The information to assist retrieving further information related to the event may include at least one of a reference to the further information at an information source or a procedure describing how to gather the further information.

The data structure may further include performance indicator parameters (e.g., key performance indicators). Data to populate the performance indicator parameters may be collected (e.g., in response to the occurrence of events that correspond to a data structure or event resolution). In addition to or instead of performance indicators, the data structure may include alerting/notification, resolution procedures, or both.

Event resolution may be initiated and the event resolution may reference the data structure for information about the event.

The subject matter disclosed herein may be implemented to realize one or more of the following advantages. Data structures may be generated that include information about events, and, further, information from which further information about an event may be accessed (e.g., retrieved). The data structures may be generated in response to business events related to business processes such that generation of the data structures is driven by business events and reactivity is based on the business processes.

The data structures may be declaratively defined such that data from multiple platforms may be included in a single data structure and any resource on any platform may be referenced from the data structures. A declarative approach may allow for easy modification of runtime data structures.

Data structures may be enriched with context information about an event at designtime, instantiation, or during runtime. Multiple systems may be required to resolve an event and various systems having different platforms may tacitly communicate (and tacitly synchronize data) by updating a same data structure representing information about an event.

Performance indicators may be stored in the data structures such that performance may be measured based on the indicators over a period of time (e.g., an amount of time to resolve an event may be measured).

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

In general, FIGS. 1-4 relate to data structures for context information related to business events. As used in reference to features of FIGS. 1-4, clients are clients in the sense of being client programs (e.g., client applications; e.g., a client program having a client/server relationship with a server program); although, the term client, as used herein, may refer to a client system (e.g., a computer system where a client program resides and the computer system having a client/server relationship with a server computer system). In any case, a client program may be referred to as a tool (e.g., a computer program), and, that tool may be used to access services offered by a server program. Also, a client program may be made of one or more computer programs (e.g., a client program may be an amalgamation of multiple programs). Similarly, the term server may be used in the sense of being a server program; although, the term server, as used herein, may refer to a server system (e.g., a computer system where a server program resides). A computer system may be a client system or server system by having a client or system program, respectively, residing on the computer system, where, from the view of the relationship of a client and server program, a client/server relationship may exist. A computer system need not be only a client system or a server system. For example, for one set of client and server programs, a computer system may be a client system by having a client program; yet, the computer system may be a server system by having a server program from another set of client and server programs. Although some of the figures depict a single server, a client/server system need not be limited to one server. Also, a client/server system may have periods during which clients and servers are not connected to each other. Similarly, a client need not be connected to a server to be considered a client (e.g., a client may be developed for use in obtaining services without a specific server being considered).

Figure 1:
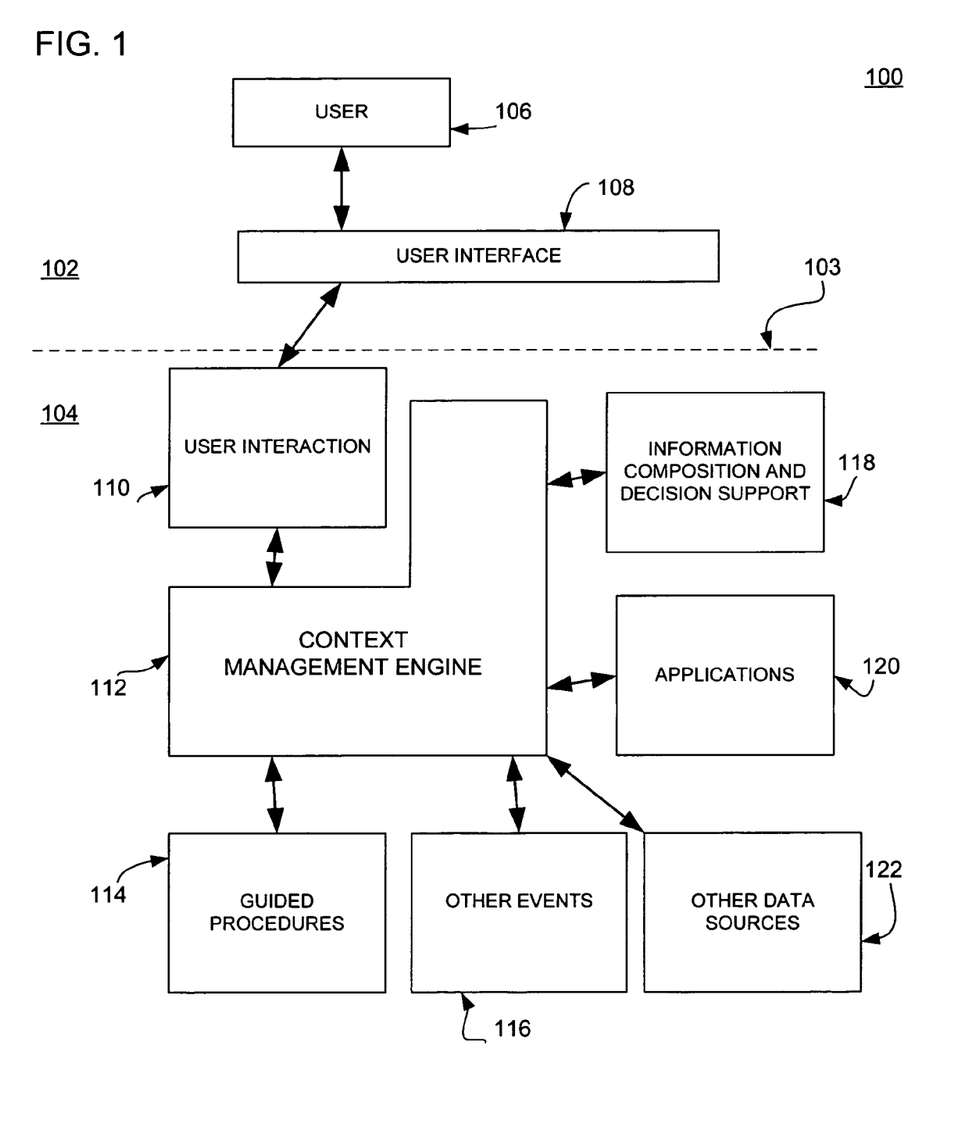
FIG. 1 is a diagram of a client/server system including a context management engine.

FIG. 1 is a diagram of a client/server system 100 including a context management engine 112. In general, the context management engine 112 manages context information for events. To manage the information, the context management engine 112 may generate a data structure that corresponds to the event, where the data structure includes information about the event and may further include information about how to retrieve further information related to an event. For example, in response to receiving data characterizing a user-generated event from a user interface 108 of a client system 102, a user interaction module 110 of a server system 104 may forward data related to the event to the context management engine 112. The context management engine 112 may generate or update a data structure to reflect the event and include in the data structure information about the event (e.g., a user identification of a user 106 that has generated the event, a description of the event, and the like). Then, to resolve the event (e.g., consume the event), the context management engine may forward a link to the data structure to one of the applications 120 that may handle the event (e.g., perform an action that satisfies a request if the event is a request).

The client/server system 100 includes the client and server systems 102, 104. The client system 102 can interact with a user who interacts with the user interface 108. Interactions with the user interface 108 may generate a user-generated event that is communicated to the user interaction module 110 of the server system 104; however, not all user interaction need result in events that are communicated to the server system 104. The user interface 108 may be a web services application that is viewed in a web browser of the client system 102 or another type of user interface.

The server system 104 includes the user interaction module 110, the context management engine 112, information composition and decision support 118, applications 120, and guided procedures 114. The user interaction module 110 handles user interaction between the user interface 108 of the client system 102 and the server system 104. In addition to receiving event information from the user interface 108, the user interaction module 110 may send information relating to services to be offered to the user interface 108. In variations, the user interaction module 110 may request information about the context of an event from the user interface 108.

As described above, the context management engine 112 manages context information. The context management engine 112 may modify or generate a data structure in response to receiving an event. Events may be user-generated, as described above, or they may be machine-generated from other sources (e.g., other events 116). For example, an event may be a work order message that is received in response to a work order request from another server system (i.e., a server system other than the server system 104 of FIG. 1).

Events that are received at the context management engine 112 may be related to a business process, such that the events are considered business-driven. For example, a business process may be modeled in a visual modeling tool similar to SAP's VISUAL COMPOSER, such as ZENFLOW. The visual modeling tool may describe the business process in a messaging protocol such as Business Process Execution Language ("BPEL"; e.g., version 1.1), and the server system 104 may follow the computer-implemented business process to provide a service to the user 106. In the example, events may be related to messaging events that relate to the computer-implemented business process, such as receiving a work order, generating an invoice, and the like. The context management engine 112 may receive data characterizing the events and decide how to resolve the events in accordance with the computer-implemented business process.

For example, the business process may define that a work order is to be generated in response to receive a payment. The computer-implemented business process may define that, in response to receiving a payment message, a work order message is to be generated. The context management engine 112 may receive data characterizing the receipt of a payment message and generate a data structure that identifies the message. In addition, the context management engine 112 may define how to obtain account information related to the payment (e.g., a bank account number, a bank routing number, and an internet protocol address of a bank processing system) and include that information in the data structure. To assist in resolving the event, the context management engine 112 may further send a request to a work order generation module (e.g., one of the applications 120) with a link to the data structure, and the work order generation module may, in turn, generate the work order. Information that directs the context management engine 112 to send the request to a work order generation module may be included in the data structure (e.g., the data structure may include event resolution information, such as a state diagram to follow), may be part of a guided procedure defined for payments (e.g., the context management engine 112 may reference guided procedures 114 to determine how to assist in resolving the event), and the like.

By generating the data structure, the context management engine 112 enables completion of a business process (e.g., generating the work order) and may encapsulate context information (e.g., the information about the event) in the data structure, such that other modules that resolve an event need not find context information themselves. In addition, the data structure may be written in a declarative language such that the data structure is platform-independent and may be easily referenced by components other than the context management engine 112 so those components need not be adapted to platform-dependent data sources to obtain context information and the amount of communication between components may be reduced (e.g., by including information about the event in the data structure).

Information composition and decision support 118 may assist in finding information related to an event that may be included as context information in a data structure corresponding to the event and information that may assist in resolving an event. For example, information from a database of employees may provide context information for a user-generated event from an employee. As another example, the information composition and decision support 118 may infer information from patterns of information (e.g., if a sequence of five payments are received that total over a threshold amount, the information composition and decision support 118 may infer that the sender of the payments is an important entity for which priority of processing should be given). The information and decision support 118 may also support requests for information from data structures that include context data. For example, a request may be made to show events related to certain business objects in a context, and the information and decision support 118 may be able to determine which events relate to one or more business objects. As exemplified above, the information composition and decision support 118 may assist in capturing or inferring information from data structures. For example, an existence of a specific patterns or relationship in the data structures may be calculated. Further, information which would be needed to complete a task may be calculated (e.g., based on a pattern, information that is necessary to complete a pattern such that a business process may be completed may be computed). Information may be obtained or inferred from event-aware work contexts.

Applications 120 represent applications that may be used to assist in resolving an event. For example, the context management engine 112 may send a link to a data structure corresponding to an event to one of the applications 120, which may then use the data structure (e.g., referencing and updating context information in the data structure) to complete a task that responds to the event.

In general, guided procedures 114 may provide a framework to generate, model, and manage workflows. Various backend systems may be accessed by combining different types of services and applications. In designtime, workflows may be generated and modeled. In runtime, different users may have different roles with respective workflows that are guided by, for example, assignment of different tasks, and administrative users may manage and change workflows as desired.

The guided procedures 114 may assist the context management engine 112 in determining a resolution of an event. For example, if a user-generated event received at the context management 112 relates to a guided procedure of a user, the context management engine 112 may determine an event resolution procedure to initiate based on the corresponding guided procedure. For example, if the user 106 submits a reimbursement request through the user interface 108, the context management engine 112 may generate a data structure including information about the reimbursement request and consult the guided procedures 114 to determine that the data structure is to be sent to one of the applications 120 for processing (e.g., to start or continue a business process).

In addition to user-generated events, and data from information composition and support 118, applications 120, guided procedures 114, and user interaction 110, other events 116 may be received by the context management engine 112 and other data sources 122 may be accessed. For example, messaging events may be other events that are received at the context management engine 112. As another example, a database of employee information may be one of the other data sources 122.

Figure 2:
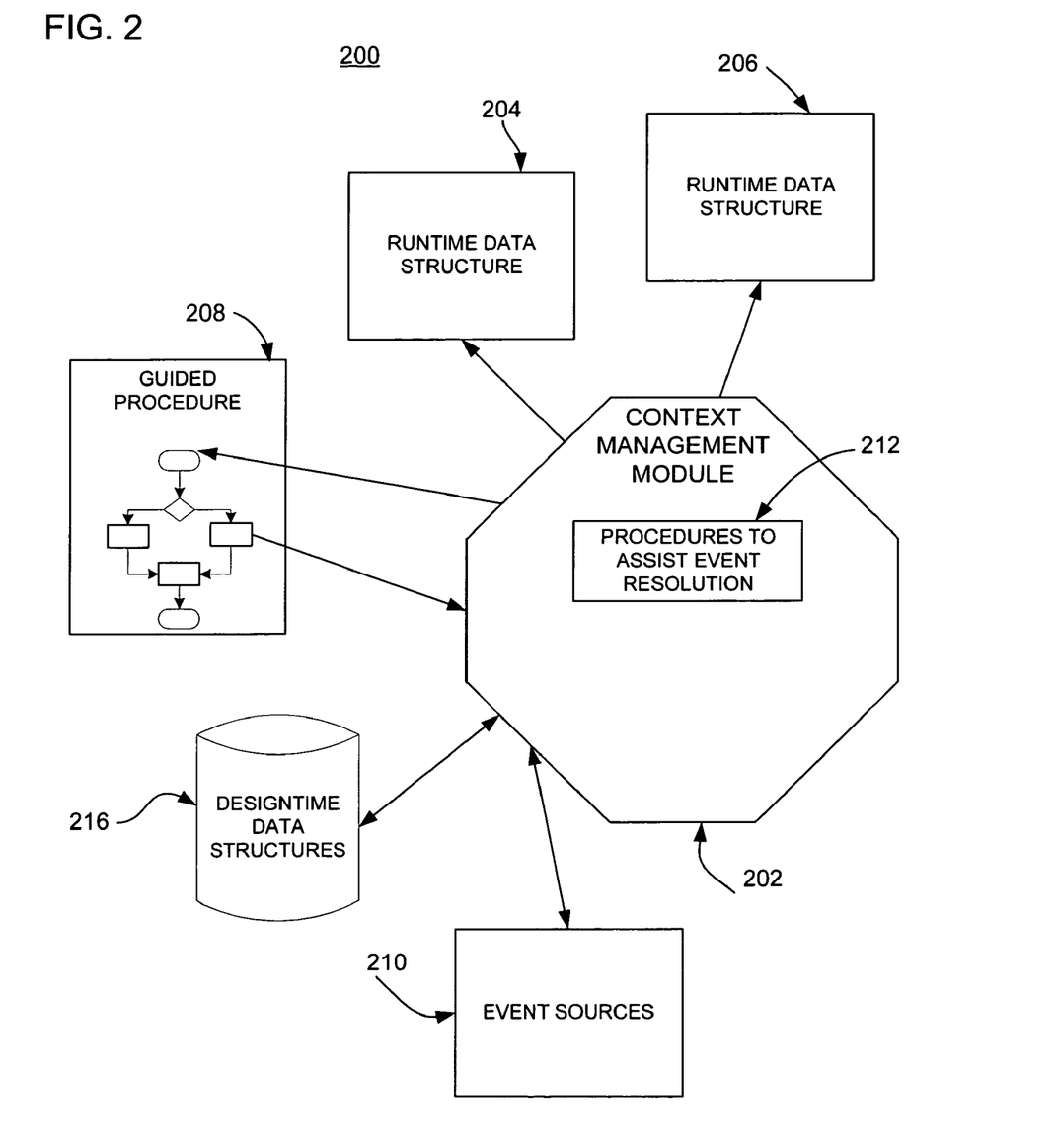
FIG. 2 is a diagram of a context management system.

FIG. 2 is a diagram of a context management system 200. The context management system 200 includes a context management module 202, runtime data structures 204, 206, event sources 210, designtime data structures 216, and a guided procedure 208. In general, the context management system 200 generates data structures 204, 206 that correspond to events and includes information in the data structures 204, 206 that corresponds to information about the corresponding events, which may be referred to as context data. In addition, the context management system may assist in resolving events with the use of the data structures 204, 206, as information related to an event is encapsulated in the data structures. Components of FIG. 2 may be similar to components of FIG. 1. For example, the context management module 202 of FIG. 2 may perform operations similar to that of the context management engine 112 of FIG. 1.

The context management module 202 generates runtime data structures 204, 206 from designtime data structures 216. Each of the runtime data structures 204, 206 may correspond to an event or a sequence of events. For example, a sequence of payments from a customer may have a single corresponding data structure, or multiple corresponding data structures. There may be a type of designtime data structure that corresponds to a type of event. For example, one type of data structure may be a reimbursement data structure and reimbursement events may have a corresponding reimbursement data structure instantiated to include information about a reimbursement request being received as an event.

To generate runtime data structures 204, 206 from designtime data structures 216, the context management module may make a copy of a designtime data structure and populate the copy with information about an event. To do so, the designtime data structures 216 may be defined in accordance with a declarative language, such that compilation is not necessary (e.g., a runtime instance of a data structure may merely be a copy of the designtime data structure). In addition, by being defined in accordance with a declarative language, a runtime data structure may be easily used across different platforms. For example, a runtime data structure may be generated in a JAVA-based platform and MICROSOFT WINDOWS-based applications may easily read the data structure without any transformations of an electronic document including the data structure.

To keep the runtime data structures 204, 206 lightweight or to plan for dynamic composition of data, the data structures 204, 206 may include, in addition to information about an event, information that may be used to find further information about an event. For example, a runtime data structure may include a tag "Employee Database for User" and a link to the event source from which further information about an employee may be found. As another example, a procedure to find further information may be included. For example, a runtime data structure may include a series of tags that correspond to a sequence of actions to find information, such as "employee contact information," "lookup employee name in 'human relations' database to retrieve user identification number," and "employee contact information located in 'contact database' by user identification number," which indicate that with an employee name, the user identification number should be looked-up, from which employee contact information may be found based on a user identification number.

The information that may be used to find further information about an event may be included in a designtime data structure such that the information is included in a runtime data structure, or the context management module 202 may generate the information (e.g., through a protocol generator for generating language in accordance with the protocol used to convey the information). To interpret the information, for example, applications may include a protocol interpreter.

The context management module 202 may assist in resolving events. Event resolution involves determining how to respond to an event, if at all, and, if so, responding to an event. Events, as used in this description, may refer to events that are part of a business process and are implemented in a computer (e.g., an event object). The context management module 202 may assist in resolving events by determining the relevance of an event (e.g., determining which computer-implemented business process corresponds to an event and a portion of the business process to which the event corresponds), generating or updating a data structure to correspond to the event (e.g., one of the runtime data structures 204, 206 may be generated or updated to reflect an event), interpreting a business process to determine whether any action is to be taken, and, if so, following the business process.

For example, an event may be a payment message that is received and an event object may include information about the payment and an identifier for the event. The context management module 202 may determine that the payment message corresponds to a customer intake business process as a determination of the relevance of the event (e.g., identifying the business process as being relevant). The context management module 202 may generate a runtime data structure corresponding to the payment message that includes a time of the payment being received, an amount of the payment, and a reference to the message identifier of the payment message. The context management module 202 may interpret a guided procedure (e.g., the guided procedure 208) corresponding to the business process that indicates that a confirmation is to be generated and a warehouse is to be notified of the payment. Then, the context management module 202 may send the data structure to an application component that generates work orders and to another application component that handles warehouse intake.

In variations, the context management module may associate an event with a runtime data structure and vice versa. For example, an event may be modified to contain an identifier of a corresponding runtime data structure and the runtime data structure may include an identifier of the event (e.g., such that the event may be accessed by an application that uses the data structure to resolve the event). In variations, the context management module may pull data from various data sources to populate a runtime data structure.

The context management module 202 may include procedures to assist in event resolution 212, which may be used to calculate the relevance of an event (e.g., a guided procedure corresponding to an event), interpret guided procedures to determine how to assist in resolving an event, and call an application to resolve an event (e.g., perform a remote function call to an application to process payments). Procedures to assist in event resolution 212 may include procedures based on business rules, state diagrams or processes (e.g., a series of operations to perform).

As multiple events may be received from different sources that exist on different platforms, and the context management module 202 may compute the relevance of an event to a business procedure, the context management module 202 may be used to correlate events from different platforms to a single business process.

In addition to including information about an event in a runtime data structure, key performance indicators may be included in a runtime data structure. The performance indicators may be used to measure one or more qualities of event resolution. For example, a time that an event is received and a time an event was resolved may be kept in each data structure, from which an average event resolution time may be computed across multiple runtime data structures. The performance indicators may be context-specific. For example, the response time for confirming orders may be computed for runtime data structures that represent payment events. Performance indicators may be related to an event resolution procedure that acts on the data structure. For example, survey results of customer satisfaction of goods may be included in a runtime data structure.

A runtime data structure may include ontologies that describe data and information available in the context. For example, a runtime data structure may include a description of relationships of data and data included in the runtime data structure. For example, a runtime data structure may include an ontology that describes a payment runtime data structure includes a thirteen-digit customer number that follows a certain format. Support for ontologies may enable industry-specific descriptions of data. For example, different customer-number formats may be described in different ontologies.

The context management module may infer information from runtime data structures 204, 206. For example, patterns may be defined that define an inference of further data (e.g., a pattern of data may be modeled in a visual modeling tool). The context management module 202 may use the patterns to determine an existence of the patterns. Similarly, the context management module 202 may infer information based on relationships of data. For example, if a payment data structure and work order completion data structure have been generated and they are related to a same order number, the context management module may infer that the data structures may be archived (e.g., as no further event resolution may be expected). An appearance of patterns may result in event creation.

To assist in coordination of information, a same runtime data structure may be shared by various applications. For example, multiple services may use a same context instance, such that changes to the data structure from one service may be tacitly communicated to other services. In addition, the data structure used by an application may be shared with user interaction. For example, a user may generate an event that causes an update of a data structure that is being worked on by a service.

As the context management module 202 may determine a relevance of an event to a business process, the context management module 202 may manage stateful events. For example, by tracking a progress of a business process, alerts, or tasks.

Event sources 210 may include user and machine-generated events. As examples, event sources 210 may include user interaction from client applications, messages from remote systems, and the like.

In variations a user, such as an administrative user of the context management module 202, may view event resolution during runtime. For example, an overview of a situation in a event resolution procedure may be viewable by a user based on key performance indicators that are interpreted and displayed to a user in a graphical user interface with graphical patterns representing a business process (e.g., a data flow diagram may represent a business process and progress in the business process may be displayed in the data flow diagram).

In variations, a user may be able to collaborate with the context management module 202 to resolve events. For example, web support for an insurance company application may assist a user in adding a car to an insurance policy by changing a business process while the user is adding a car to the policy. For example, if a default business process restricts input of vehicle identification numbers to a sixteen-digit format for newer cars, web support may change the business process to allow thirteen-digit vehicle identification numbers for older vehicles that use such a format.

To assist in resolving events, the context management module 202, in variations, may act as an RSS ("Really Simple Syndication"; e.g., version 2.0) feed server. For example, the context management module 202 may pass events or correlated events on as an RSS feed to RSS clients. This arrangement may enable notification capabilities for business experts. In addition, this arrangement may enable use of standard RSS notification technology for integrating with events. For example, an application that is to resolve an event may receive an RSS feed as a technique for receiving runtime data structures as a representation of the event. Other standards that may be supported for notifications may include, as examples, WS-Notification ("Web Services Notification") and WS-Eventing ("Web Services Eventing").

Figure 3:
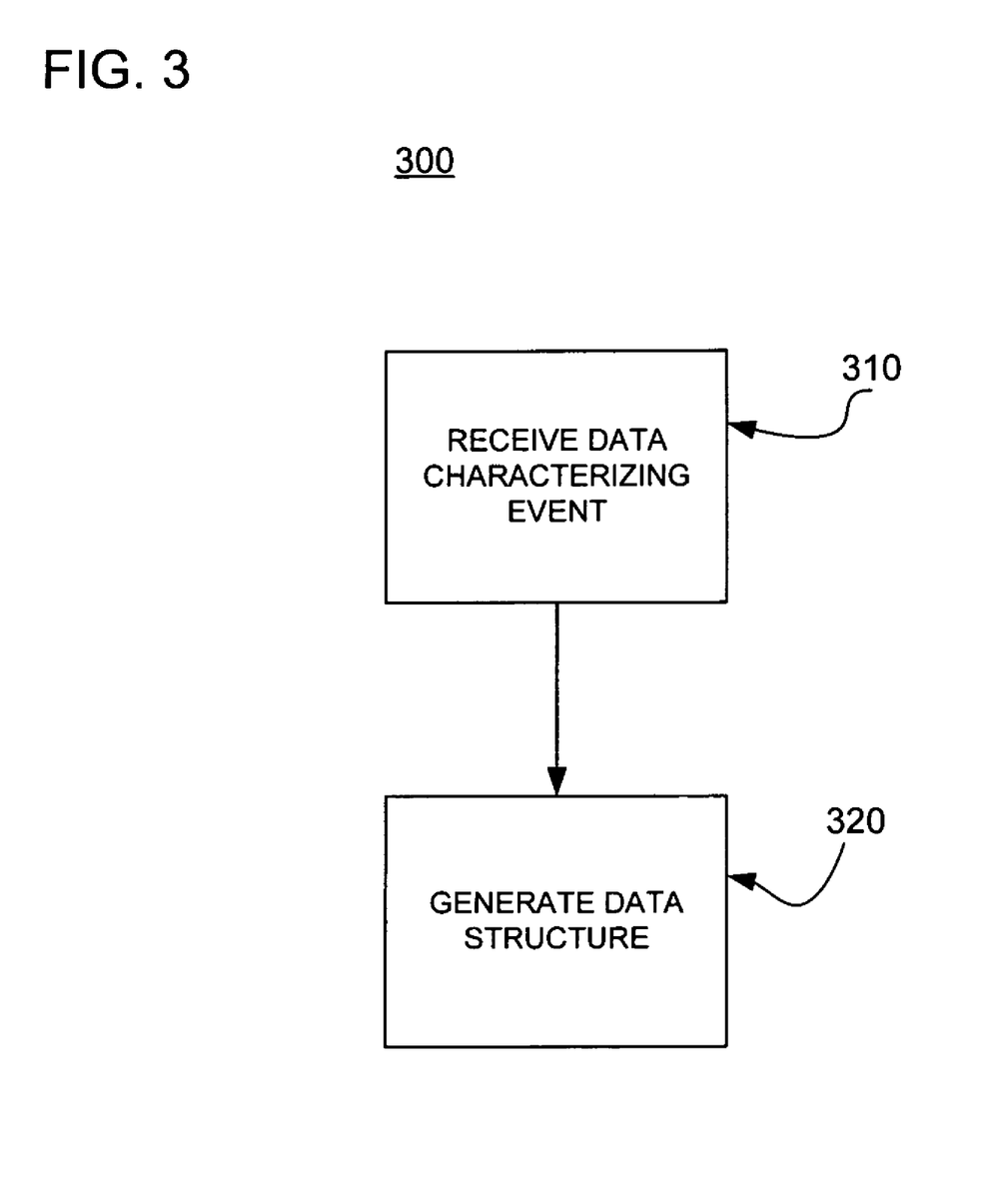
FIG. 3 is a flowchart illustrating a process of generating a data structure.
Figure 4:
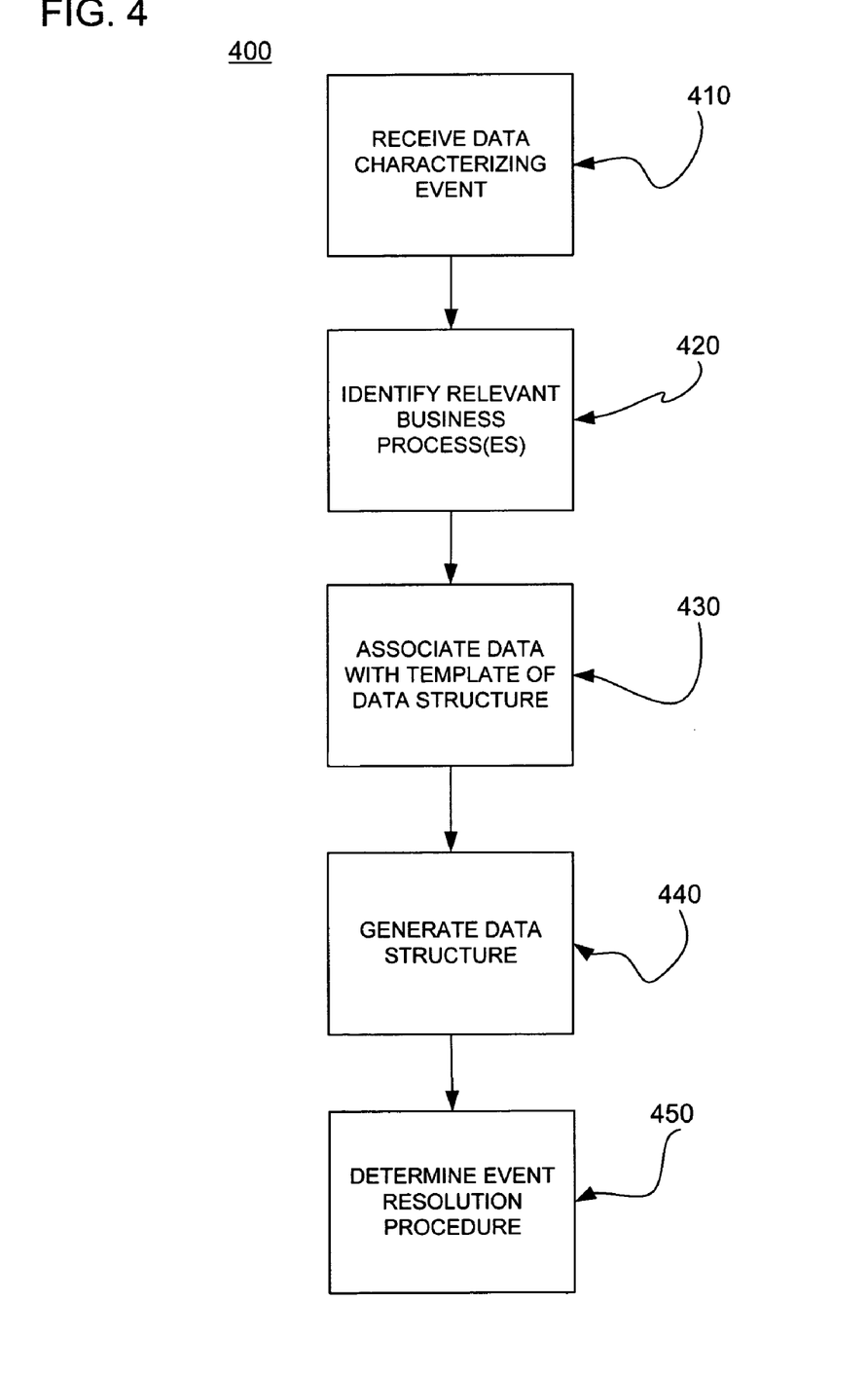
FIG. 4 is a flowchart illustrating a process of assisting resolution of a received event.

FIGS. 3-4 are processes that may be performed by components of the client/server system 100 of FIG. 2 or the context management system 200 of FIG. 2. For example, the context management engine 112 of FIG. 1 or the context management module 202 of FIG. 2 may perform the operations of FIG. 3.

FIG. 3 is a flowchart illustrating a process 300 of generating a data structure. The data structure that is generated may be a runtime data structure that describes information in a declarative format, as described with reference to the runtime data structures 204, 206 of FIG. 2. The data structure may assist in resolving an event by including information about an event in a single source and conveying that information to a system that resolves the event (e.g., a system that is not compatible with the system that generated the event but can interpret the runtime data structure).

Data characterizing an event is received (310). The data characterizing an event may be any type of information, such as an event identifier, a message including information about the event, or the event itself (an event data object that includes various information corresponding to an activity). The event may be a user or machine (e.g., computer)-generated event. The event may be a business activity of a business process. For example, the event may be the receipt of a payment in an order processing business process. The event may be related to a business process defined in relation to messaging orchestration (e.g., related to a business process described in accordance with the BPEL specification), or other types of computer-implemented business processes.

By having events related to business processes, event resolution may be focused on resolution of business events, which are separate from technical events (e.g., buffer overflow). Thus, the context of event resolution may differ. This may affect, for example, how event resolution is handled (e.g., by computing relevance of events to business processes and interfacing with enterprise computing systems to resolve events).

A data structure may be generated (320) in response to receiving the data characterizing the event. In general, a data structure may be generated for each event such that there is a one to one correspondence. When an event relates to a sequence of events, the first event may cause the generation of a data structure and later events may cause an updating of the data structure.

The data structure may be a runtime data structure, similar to the runtime data structures 204, 206 of FIG. 2. The data structure may be defined declaratively and easily transportable across various platforms. For example, the data structure may be defined in a tree-structured language similar to eXtensible Markup Language and stored in an electronic document (e.g., a file) that may be read by multiple systems (e.g., stored using an ASCII ("American Standard Code for Information Interchange") encoding format).

The data structure may contain information about an event, information from which information about an event may be obtained, or both. In addition, the data structure may contain information related to performance indicators such that the performance of aspects related to event resolution may be determined. The data structure may also contain an ontology, as discussed with reference to FIG. 2.

The data structure that is generated may be a generic data structure that is generated for all events, the data structure may be a type of data structure that depends on the event received, or some combination of the two techniques. For example, all types of events may result in a data structure being instantiated. As another example, a payment event may result in a payment data structure being generated. As another example, a reimbursement request event may result in a debt data structure being generated (e.g., a type of data structure need not have a one to one correspondence to an event).

FIG. 4 is a flowchart illustrating a process 400 of assisting resolution of a received event. In general, the process may result in a determination of an event resolution procedure for an event. For example, in response to receiving a reimbursement request, a data structure containing information about the reimbursement request may be generated and a system may determine that the data structure is to be forwarded to an accounting system to process the request. Portions of the process 400 may be similar to portions of the process 300 of FIG. 3. For example, the first (410) and fourth (440) activities of the process 400 may be similar to the first (310) and second activities (320) of the process 300 of FIG. 3.

Data characterizing an event is received (410). The data may include information about the event or the event itself.

One or more relevant business processes are identified (420). For example, as a result of computing the relevance of an event (e.g., the event that is received at 410). Computing the relevance of an event may involve determining an association between an event and a business process that may be defined by a business process language, business rules, a guided procedure, or the like. For example, an event may be a smoke detector sensing a presence of smoke and a business rule may relate to smoke detector events. A computing system (e.g., the context management system 200 of FIG. 2) may determine that the event relates to the business rule. To determine the relevance of an event (and, consequently, to identify relevant business processes), a mapping of events to business processes or event resolution procedures may exist. For example, a table having mappings of types of events to business processes (or, particularly, portions of business processes, business rules, or guided procedures). An event may relate to multiple business processes. For example, an emergency event may relate to all business processes, such that all business processes are to halt.

Data is associated with a template of a data structure (430). For example, data characterizing an event may be associated with a data structure corresponding to the type of event (e.g., such that the event is associated with the data structure). Associating the data with a template of a data structure may involve determining a type of data structure (e.g., a designtime data structure that may be used to generate a runtime data structure similar to the data structures 204, 206 of FIG. 2) that corresponds to an event. For example, there may be different types of data structures that correspond to different events. The template may be a designtime version of a runtime data structure. The template may include default values, procedures to assist in resolving an event, information to assist in obtaining information about an event, or other default data.

A data structure is generated (440). The data structure may be the data structure that is associated with the data characterizing the event (e.g., at 430). Generating the data structure may involve generating a copy of a runtime instance of the data structure from a designtime version of the data structure. Generating the data structure may also include populating the data structure with information. Information about the event characterized by the data may be included in the data structure. Information that may be used to find further information about the event may be included (e.g., a procedure to find information about an employee that generated an event may be included in a data structure). Ontologies and performance indicators may be included in the data structure. Business procedures to resolve an event may be included in the data structure. Information in the data structure may be in a format in accordance with a declarative programming language that may be interpreted by other systems (e.g., applications that interpret the data structure to resolve events).

An event resolution procedure may be determined (450). The event resolution procedure may be determined based on the computation of the relevance of an event (420). For example, a business process to be followed may be determined and an activity to perform in accordance with that business process may be determined. The data structure that is generated (at 440) may be used to determine an event resolution procedure. The data structure may be used as part of the event resolution procedure. The data structure may act as a single source for information about an event or sequence of events such that the data structure may be a central reference source to assist in resolving an event. An event resolution procedure may involve not acting, calling an application to perform an activity, or another activity.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments may be implemented and are within the scope of the following claims. For example, the operations may differ and still achieve desirable results. As another example, although FIGS. 1-2 include a certain combination of components, variations may include different, fewer, or additional components. As another example, the process 400 of FIG. 4 may exclude the activity of associating data with a template of a data structure (430) (e.g., a generic template may always be used). In certain implementations, multitasking and parallel processing may be preferable. Other embodiments are within the scope of the following claims.

What is claimed is:

1. A computer-program product embodied on tangible media, the computer program product operable to cause data processing apparatus to perform operations comprising:
receiving, by a first software component, data characterizing an event, the event comprising at least part of one or more business processes, resolving of the event requiring at least one resolution action to be performed by a second software component external to the first software component;

deriving, from the received data, context information about the event, the context information comprising a location of additional data required for resolving the event;

generating, at run time in response to the receiving of the data characterizing the event, a data structure to serve as a central source for resolving the event, the data structure comprising: the derived context information and performance indicators for receiving performance data relating to resolution of the event; and sending, to the second software component, a link to the data structure for use in resolving the event.

2. The computer program product of claim 1 operable to perform further operations comprising:

generating the event in response to user interaction with a user interface from which a user is enabled to gain services of a business process.

3. The computer program product of claim 1, wherein the event relates to an orchestration of a web service in accordance with a business process, the business process being described in a messaging protocol for business processes and implemented in accordance with the messaging protocol.

4. The computer program product of claim 1 operable to perform further operations comprising:

modeling a business process and the data structure in a visual modeling tool; and generating a runtime implementation of the business process that is one of the business processes.

5. The computer program product of claim 1 operable to perform further operations comprising:

receiving a relationship defined in accordance with an ontology; and modifying the data structure to include the relationship.

6. The computer program product of claim 1 operable to perform further operations comprising:

selectively generating an alert if rules of any of the business processes specify the alert is to be generated in response to the event.

7. The computer program product of claim 1, wherein:

the data structure further comprises an event resolution procedure, and the computer program product is operable to perform further operations comprising:

determining whether the event resolution procedure prescribes event resolution for the event, and initiating the event resolution procedure if the event resolution procedure prescribes event resolution for the event.

8. The computer program product of claim 1 operable to perform further operations comprising:

selecting a designtime data structure from a plurality of designtime data structures, the designtime data structure to be used to generate the data structure and the selecting depending on the data characterizing the event.

9. The computer program product of claim 1, wherein the information to assist retrieving further information related to the event comprises at least one of a reference to the further information at an information source or a procedure describing how to gather the further information.

10. The computer program product of claim 1, wherein the computer program product is operable to perform further operations comprising collecting the performance data relating to resolution of the event to populate the performance indicator parameters.

11. The computer program product of claim 10 operable to perform further operations comprising: computing a average performance indicator parameter value based on the performance data collected and used to populate the performance indicator parameters of the data structure and other performance data relating to at least one other event and stored in at least one other data structure.

12. The computer program product of claim 1 operable to perform further operations comprising:

initiating event resolution, the event resolution to reference the data structure for information about the event.

13. The computer program product of claim 1 operable to perform further operations comprising: computing a relevance of the event, the computing comprising determining an association between the event and the one or more business processes, the association being defined by at least one of a business process language, a business rule, and a guided procedure.

14. The computer program product of claim 1, wherein the performance indicator parameters comprises a time required to resolve the event.

15. A computer-implemented method comprising:

receiving, by a first software component at a processing system comprising at least one programmable processor, data characterizing an event, the event corresponding to a business activity in one or more computer-implemented business processes, resolving of the event requiring at least one resolution action to be performed by a second software component external to the first software component;

deriving, from the received data, context information about the event, the context information comprising a location of additional data required for resolving the event;

generating, at run time in response to the receiving of the data characterizing the event, a data structure to serve as a central source for resolving the event, the data structure being defined in accordance with a declarative programming language and the data structure comprising: the derived context information and performance indicators for receiving performance data relating to resolution of the event; and sending, to the second software component, a link to the data structure for use in resolving the event.

16. The method of claim 15 further comprising:

modeling a business process and the data structure in a visual modeling tool; and generating a runtime instance of the business process being one of the computer-implemented business processes.

17. The method of claim 15 further comprising:

receiving a relationship defined in accordance with an ontology; and modifying the data structure to include the relationship.

* * * * *